United States Patent Office 3,434,338
Patented Mar. 25, 1969

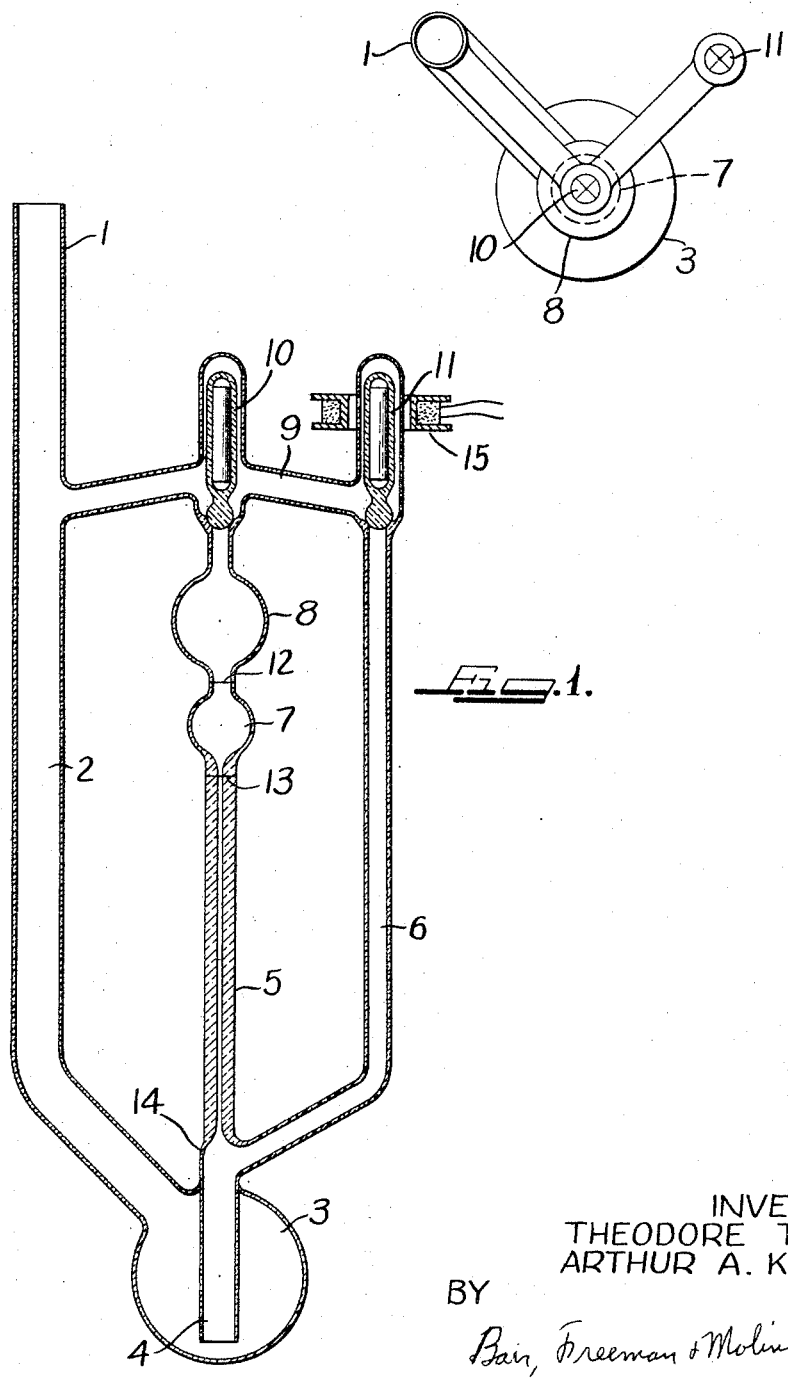

3,434,338
VISCOMETER
Theodore Tovrog, Evanston, and Arthur A. Krawetz, Chicago, Ill., assignors to Phoenix Chemical Laboratory Inc., Chicago, Ill.
Filed Oct. 1, 1965, Ser. No. 492,247
Int. Cl. G01n 11/04
U.S. Cl. 73—55  6 Claims

ABSTRACT OF THE DISCLOSURE

A viscometer for measuring the viscosity of volatile, unstable, highly reactive or radioactive liquids. A vertical inlet tube, a vertical measuring tube and a vertical pressure equalizing tube terminate at their lower ends in a common liquid phenum. At their upper ends the inlet tube is connected to each of the remaining two tubes and a magnetically controlled valve is provided for each connection. The sample is introduced and the arrangement of tubes is subjected to elevated pressures through the single inlet tube. The measuring tube includes a capillary with two sample bulbs disposed vertically above the capillary. The sample bulbs are filled by alternately opening and closing the inlet-measuring valve as the pressure in the system is varied slightly. The pressure equalizing tube counteracts the effect of sample vapor pressure on the viscosity readings.

---

This invention relates to a new apparatus for determining viscosity of volatile, unstable or highly reactive fluids or for operation remote from the operator.

Determination of kinematic viscosity of liquids is well known in the art. Conventionally, a sample of the liquid to be tested is drawn by vacuum into a capillary-type viscometer and permitted to flow through the capillary under the force of gravity. In particular, the standard method for measuring kinematic viscosity is described in "ASTM Standards," part 17, page 195, American Society for Testing and Materials, Philadelphia, 1964, and the standard test is called Standard Method of Test for Kinematic Viscosity, ASTM Designation: D445-64. The method described therein covers the determination of kinematic viscosity of transparent or opaque liquids in the range of 0.2 cs. and higher. Determinations may be made at any temperature at which the flow in glass capillary-type viscometers is Newtonian.

The apparatus for the standard test comprises essentially a viscometer, a standardized thermometer as specified in the aforementioned ASTM reference, a temperature-controlled bath in which the viscometer is immersed and a timer such as an ordinary stop watch or an electrical timing device.

There are many known capillary-type viscometer (as for example described in the aforementioned ASTM reference, page 203 ff.) and some of them have in common a capillary tube, the upper end of which is connected to a pair of interconnected vertically disposed bulbs. Visible marks are etched or in some way provided at spaced points, one mark being between the bulbs, the other below the lower bulb. The capillary tube and bulbs are filled, at least to the level of the upper mark, by drawing liquid up into the tube with suction and the liquid is brought to equilibrium temperature by immersion of the device in a constant temperature bath. Liquid is then permitted to flow under the force of gravity from the upper mark to the lower mark and the time required for the meniscus to pass between the marks is measured.

Each viscometer of the type above described must be calibrated to determine its constant, C, in units "centistokes per second." Such calibration is well known in the art. Once the constant for a given device is known, the kinematic viscosity of a sample liquid is determined simply by measuring the time in seconds for the fluid meniscus to pass from the upper mark to the lower mark and multiplying such time by the constant, C. The product of time in seconds and C is kinematic viscosity in centistokes. Such is fully described in the aforementioned ASTM reference at pages 196 to 200.

While the methods and apparatus heretofore known in the art are satisfactory for determining kinematic viscosity of non-volatile, stable and non-reactive liquids, it is sometimes necessary to determine the viscosity of fluids which by reason either of their reactivity, their instability, their volatility or radioactivity cannot be subjected to the temperature and atmospheric conditions prevailing in conventional viscometers. For example, an extremely volatile material may vaporize excessively or even boil to produce bubbles in the viscometer capillary. An unstable or reactive material may require protection by a blanket of an inert gas. Or a radioactive material may require testing with the operator remote from the apparatus. The present invention is directed to a novel viscometer which provides for testing of samples which in the aforementioned ways may be considered to be vulnerable.

It is thus an object of this invention to provide an apparatus by which the kinematic viscosity of a liquid having a high vapor pressure at the testing temperature can be measured.

It is a further object of this invention to provide an apparatus by which the kinematic viscosity of a liquid having a high reactivity or instability at the testing temperature can be measured.

Another object of this invention is to provide an apparatus by which the kinematic viscosity of a liquid which must be confined or protected from atmospheric conditions can be measured.

Another object of this invention is to provide an apparatus which may be controlled remotely to determine the kinematic viscosity of liquids which are radioactive or which are not accessible for manual treatment.

Other objects of the invention will become apparent from the description which follows.

The drawing illustrates an embodiment of the ivention wherein:

FIG. 1 is a side view in section of an apparatus embodying the invention; and

FIG. 2 is a top view of the apparatus shown in FIG. 1.

The apparatus of the viscometer of our invention is best described by reference to FIG. 1. The viscometer comprises a pressure inlet tube 1, which is an extension of side tube 2. Through tube 1 a liquid sample to be tested is introduced to bulb 3 which serves as a liquid plenum. Communicating with the lower part of bulb 3 is tube 4 which branches at its upper end into capillary 5 and side tube 6. The diameter of capillary 5 will depend upon the viscosity of the liquid being tested; the more viscous the liquid, the larger the diameter. Those skilled in the art can choose the proper diameter by reference to standard handbooks, e.g. the ASTM reference hereinbefore mentioned.

Capillary 5 is joined at its upper end to two bulbs 7 and 8 into which liquid is forced prior to testing. Bulb 8 is larger than bulb 7, preferably about three times larger in volume, for the reason hereinafter noted. Capillary 5 and bulbs 7 and 8 considered together comprise what will be designated the measuring section of the apparatus. Bulb 8 and side tubes 2 and 6 all terminate at their upper ends in manifold 9 which is inclined to the horizontal to permit easy drainage and prevent accumulation of liquid in the upper part of the viscometer. Valves 10 and 11 have ferrous metal cores and are provided at the upper termini of tubes 5 and 6 respectively. The valves may be opened and closed by permanent magnets or electromagnets, for example, by a remotely controlled electromagnetic coil 15 shown schematically positioned to operate magnetic value 11 in FIG. 1, well known in the art.

The device shown in FIG. 1 may be made wholly of glass (except for the metal in the magnetic valves) or it may, if intended for very high pressure operation, be made of metal. It must be capable of withstanding internal superatmospheric pressure. Capillary tube 5 is provided with a mark 13. A mark 12 is located between bulbs 7 and 8.

To practice the process of the invention, a sample liquid to be tested is introduced through tube 1 until bulb 3 is approximately half-filled. Tube 1 is then attached by any suitable means, preferably a flexible hose, to a controlled source of pressurized gas (not shown). The working gas for pressurization is preferably dry and/or inert according to the requirements of the liquid being tested. The viscometer is pressure-purged with magnetic valves 10 and 11 in their open positions. The system pressure is then adjusted to the predetermined test pressure. Elevated pressures as high as 40 to 50 p.s.i.g. may be used when necessary, e.g. to supress boiling. When using metal apparatus, higher pressure may be used.

The viscometer is then immersed in a regulated constant temperature bath. The degree of temperature regulation depends upon the precision required in the viscosity measurement. In our studies, temperaure variations of about ±0.05° F. were observed. If the controlled atmosphere is to serve only as a dry or inert blanket, the system may be maintained at atmospheric pressure. To fill the measuring section of the viscometer, valves 10 and 11 are closed and the pressure in the system is increased slightly to force the sample upwards to fill bulb 7 entirely and bulb 8 partially as the pressure is equalized in the system. Preferably the valve seats of valves 10 and 11 should be pre-wet to effect a good seal to prevent leakage of pressurizing gas through the valves.

If the operating pressures are such that bulb 7 does not fill immediately, the following procedure may be used to expedite this step. Valve 11 is opened momentarily to lower the liquid level in tube 6 without permitting it to drain completely. Thus the liquid in tube 6 flows into bulb 3. Then with valve 11 closed and valve 10 open, the pressure at the source is reduced slightly, tube 6 still not being completely empty. This will cause a slight lowering of liquid level in the measuring section. With valves 10 and 11 both closed, the system pressure is again increased to force an additional quantity of sample into bulb 7. The sequence may be repeated if necessary. Finally, the system pressure is readjusted to the desired value. As hereinbefore noted, bulb 8 is larger than bulb 7. This permits completely filling bulb 7 prior to the time the pressure above and below the bulbs is equalized. We have found that by increasing the size of the bulb 8, bulb 7 usually can be filled without repeating the above described sequence.

After the measuring section of the viscometer is filled, i.e. there is liquid at least to mark 12, valve 11 is opened and tube 6 is drained completely. Valve 10 is then opened and the sample is allowed to flow out of the capillary in a thin film over the hemispherical inner surface 14 of tube 4. The time in seconds required for the fluid meniscus to pass between marks 12 and 13 is measured, and such time is used to calculate kinematic viscosity as hereinbefore indicated.

Although tube 6 is shown located behind capillary tube 5 (90° to inlet 1) in FIG. 2, the location is not critical so long as tube 6 communicates above and below the measuring section to permit equalizing the pressure in the spaces above and below such section. For example, to save space, tube 6 may be located concentrically about or within tubes 1 and 2.

A specific viscometer made in accordance with the invention was calibrated at 20° C., with deionized distilled water. Its constant was determined to be 0.001583 centistokes per second. The viscosity of water at 80° C. at a pressure of 20 p.s.i.g. was measured and found to be 0.359 centistokes, which under the conditions of the experiment compares favorably with that of 0.365 centistokes indicated by Swindells, Coe, and Godfrey in J. Research Natl. Bur. Standards, 48, 1 (1952).

The viscometer was also used to determine the viscosities of volatile oil samples at temperatures just below their boiling points. For these measurements the viscometer was recalibrated at 210° F. with an oil of known viscosity. Under these conditions the constant was found to be 0.001574 centistokes per second. The close agreement between the constants determined with these different fluids further confirms the utility of the process and apparatus of the invention.

Our studies have involved the measurement of viscosity under moderate pressure, sufficiently high to reduce the volatilization and boiling of samples but insufficient to produce a significant effect on the viscosity. The method and apparatus may also be used to protect sensitive liquid materials with dry and inert blankets. Furthermore, remote control of the voscometer is easily accomplished and the instrument finds utility in atomic energy or aerospace applications.

We claim:

1. Apparatus for measuring kinematic viscosity of volatile, unstable, highly reactive or radioactive liquids comprising a liquid plenum; a pressure inlet tube, said pressure inlet tube communicating with said liquid plenum; a measuring section consisting of a capillary and a plurality of vertically disposed interconnected bulbs, said bulbs communicating with the upper terminus of said capillary and said plenum communicating with the lower terminus of said capillary; pressure equalizing means having upper and lower ends, said lower end communicating with said plenum, said pressure inlet tube communicating with both the upper terminus of said measuring section and with said upper end of said pressure equalizing means; and a plurality of independently movable valves to selectively open and close said communication of said inlet tube with said upper terminus of said measuring section and said upper end of said pressure equalizing means.

2. Apparatus of claim 1 wherein said measuring section includes two bulbs, the upper bulb being of larger volume than a lower bulb.

3. Apparatus of claim 2 where the volume of the upper bulb is about three times the volume of the lower bulb.

4. Apparatus of claim 1 wherein said valves include ferrous metal for magnetic control.

5. Apparatus of claim 1 including means for controlling said valves remote from said apparatus.

6. Apparatus for measuring kinematic viscosity of volatile, unstable, highly reactive or radioactive liquids comprising a liquid plenum; a pressure inlet tube, said pressure inlet tube communicating with said liquid plenum; a measuring section consisting of a capillary and a pair of vertically disposed interconnected bulbs, said bulbs communicating with the upper terminus of said capillary and said plenum communicating with the lower terminus of said capillary; a generally vertically disposed tube having a lower and an upper end, said lower end communicating with said plenum, said pressure inlet tube communicating with both the upper terminus of said measuring section and with said upper end; and a plurality of independently movable valves to selectively open and close communication of said inlet tube with said upper terminus of said measuring section and said upper end of said vertically disposed tube, said valves having ferrous metal cores for magnetic control.

References Cited

UNITED STATES PATENTS

| 2,048,305 | 7/1936 | Ubbelohde | 73—55 |
| 2,343,061 | 2/1944 | Irany | 73—55 |
| 2,805,570 | 9/1957 | Cannon | 73—55 |

LOUIS R. PRINCE, *Primary Examiner.*

J. W. ROSKOS, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,434,338                                                      March 25, 1969

Theodore Tovrog et al.

It is certified that error appears in the above identified patent and that said Letters Patent are hereby corrected as shown below:

In the heading to the printed specification, lines 3 and 4, "Theodore Tovrog, Evanston, and Arthur A. Krawetz, Chicago, Ill." should read -- Theodore Tovrog, Chicago and Arthur A. Krawetz, Evanston, Ill. --. Column 1, line 16, "phenum" should read -- plenum --; line 39, "1964" should read -- January 1965 --.

Signed and sealed this 14th day of April 1970.

(SEAL)
Attest:

Edward M. Fletcher, Jr.                                   WILLIAM E. SCHUYLER, JR.

Attesting Officer                                                     Commissioner of Patents